UNITED STATES PATENT OFFICE.

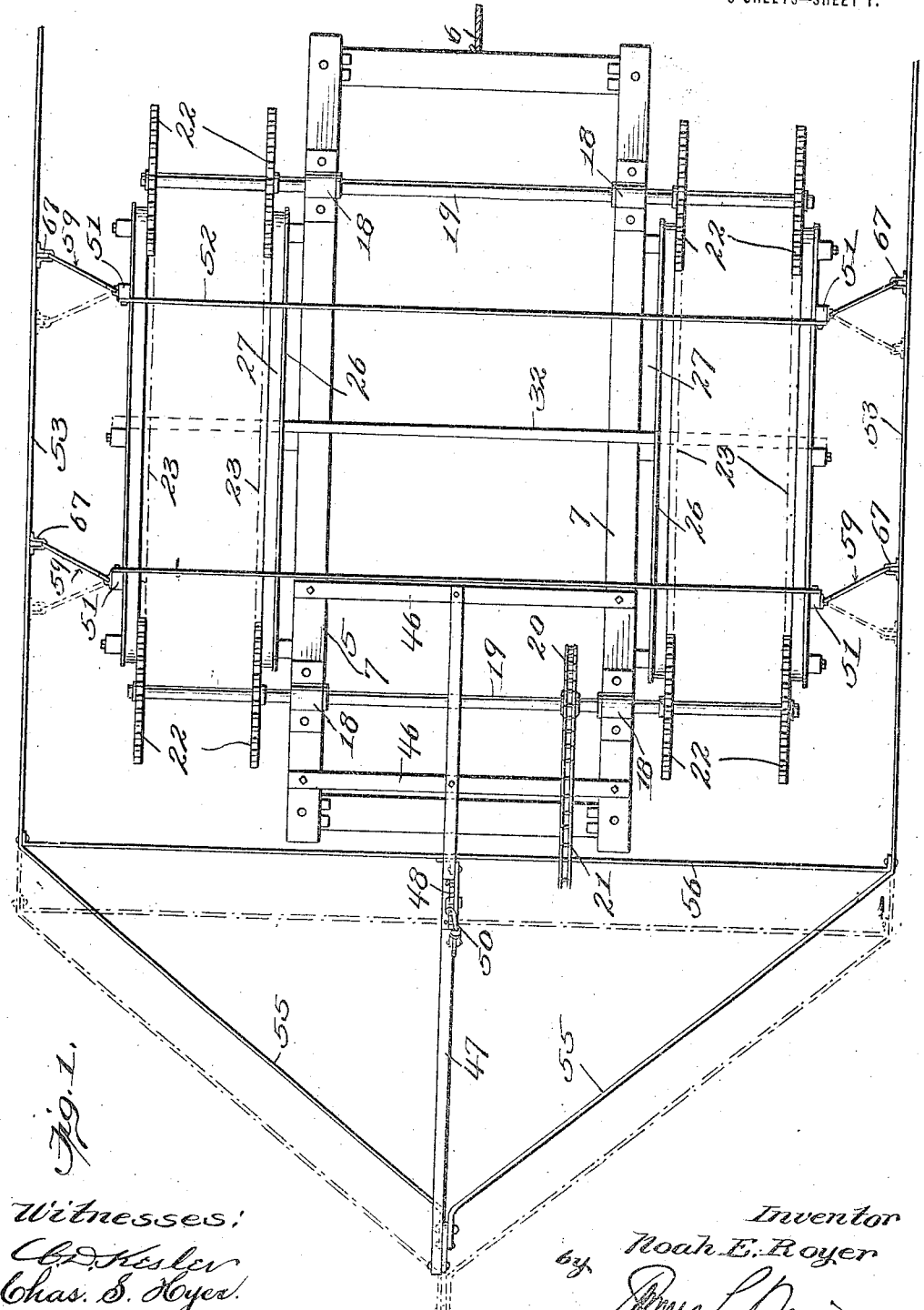

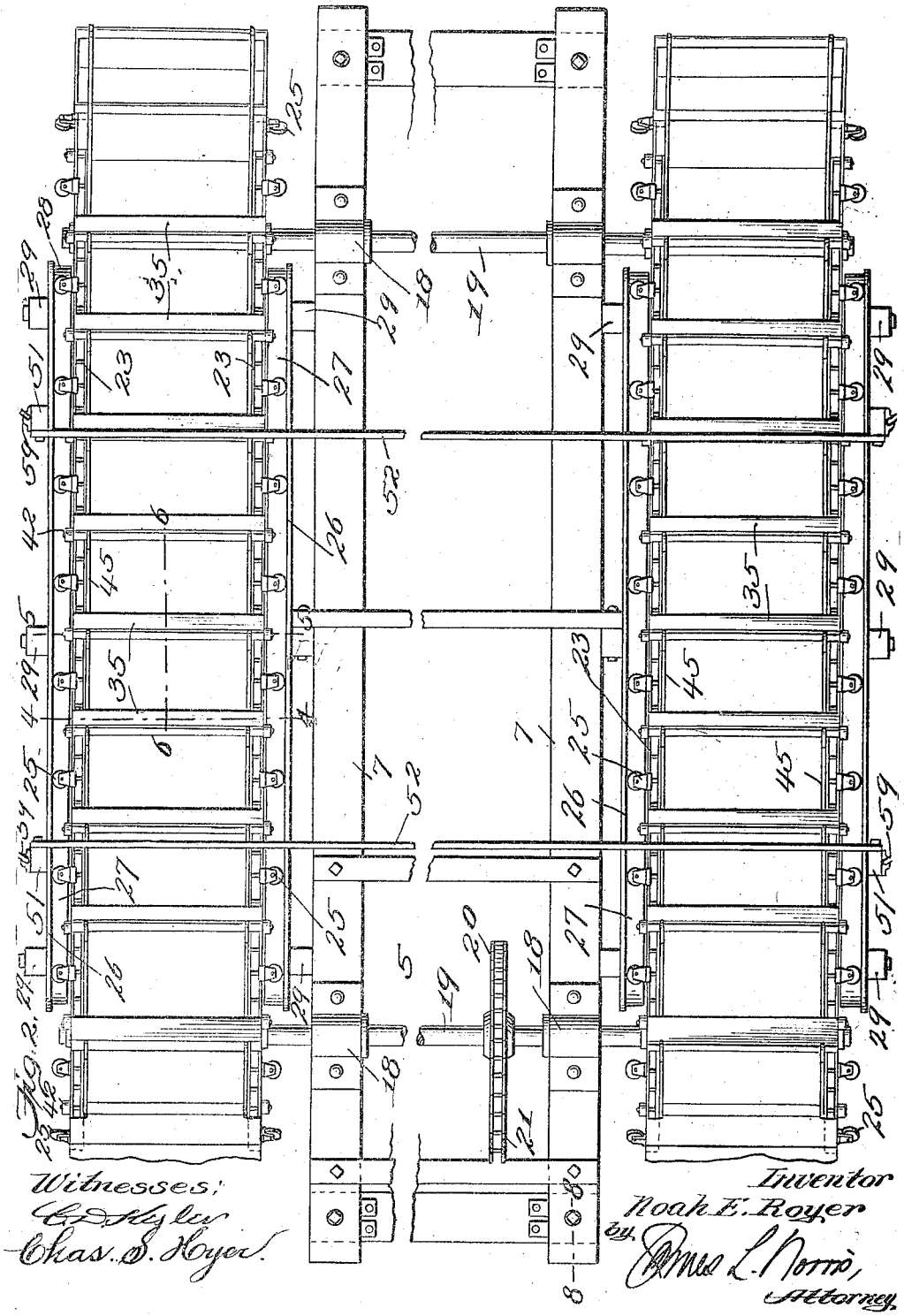

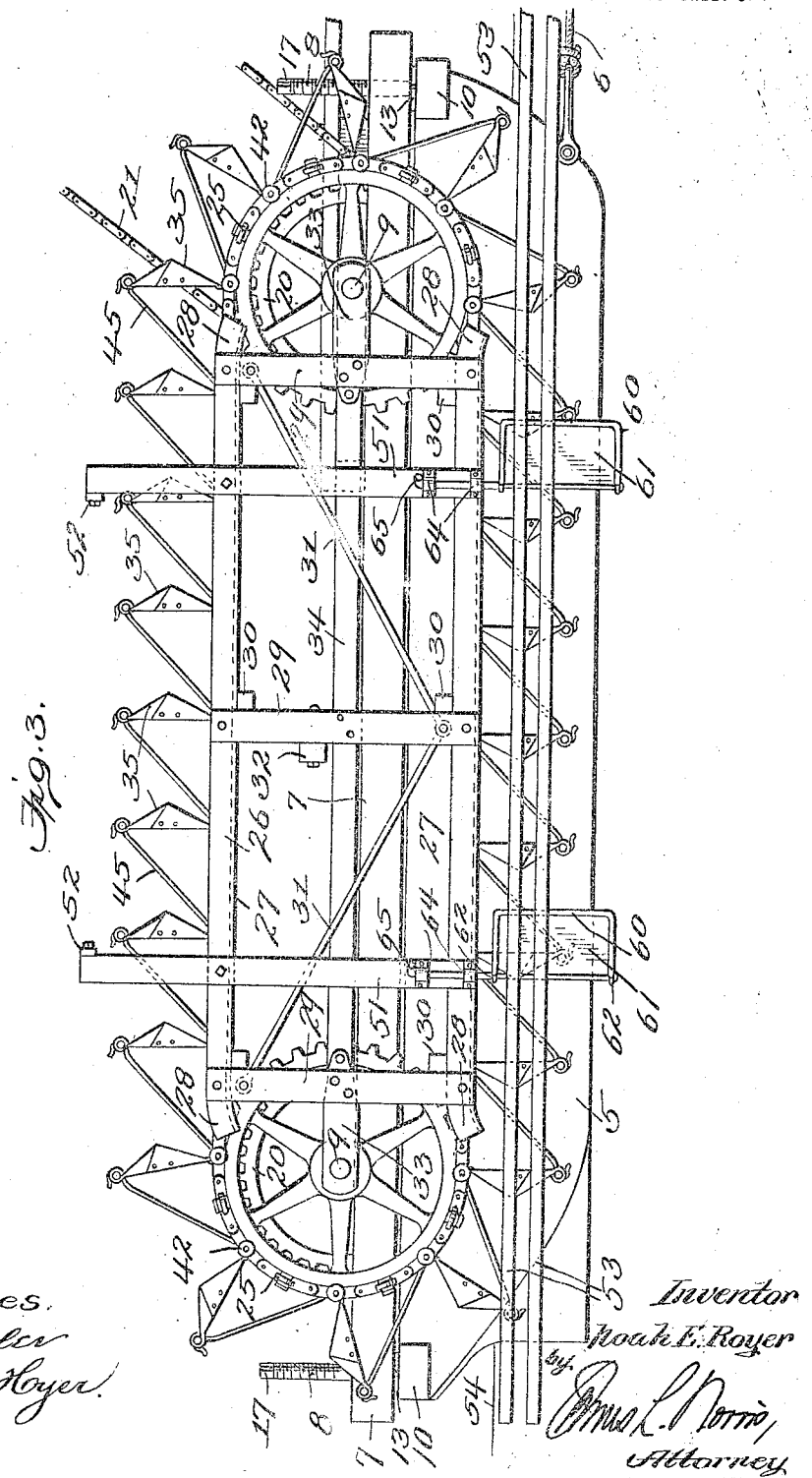

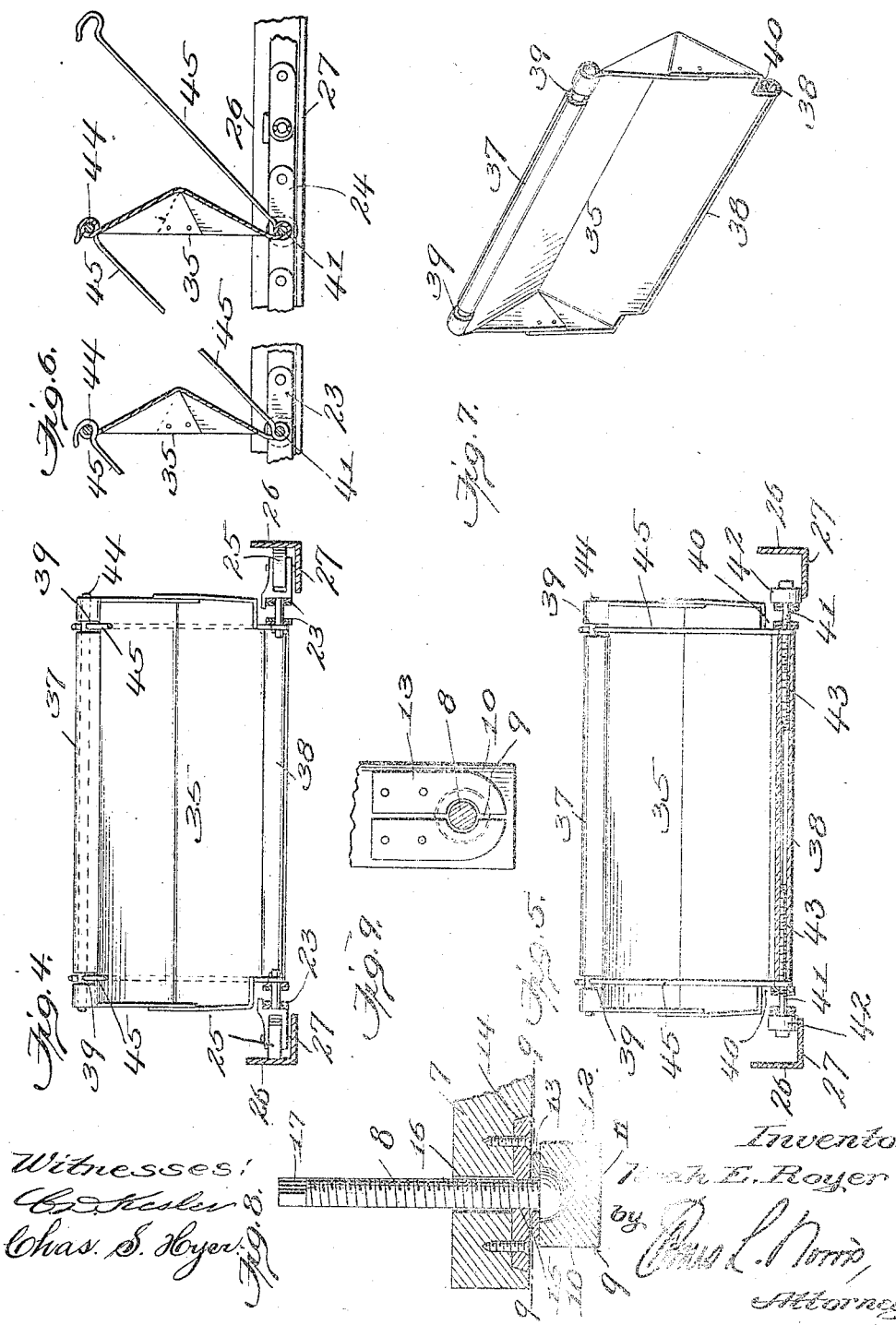

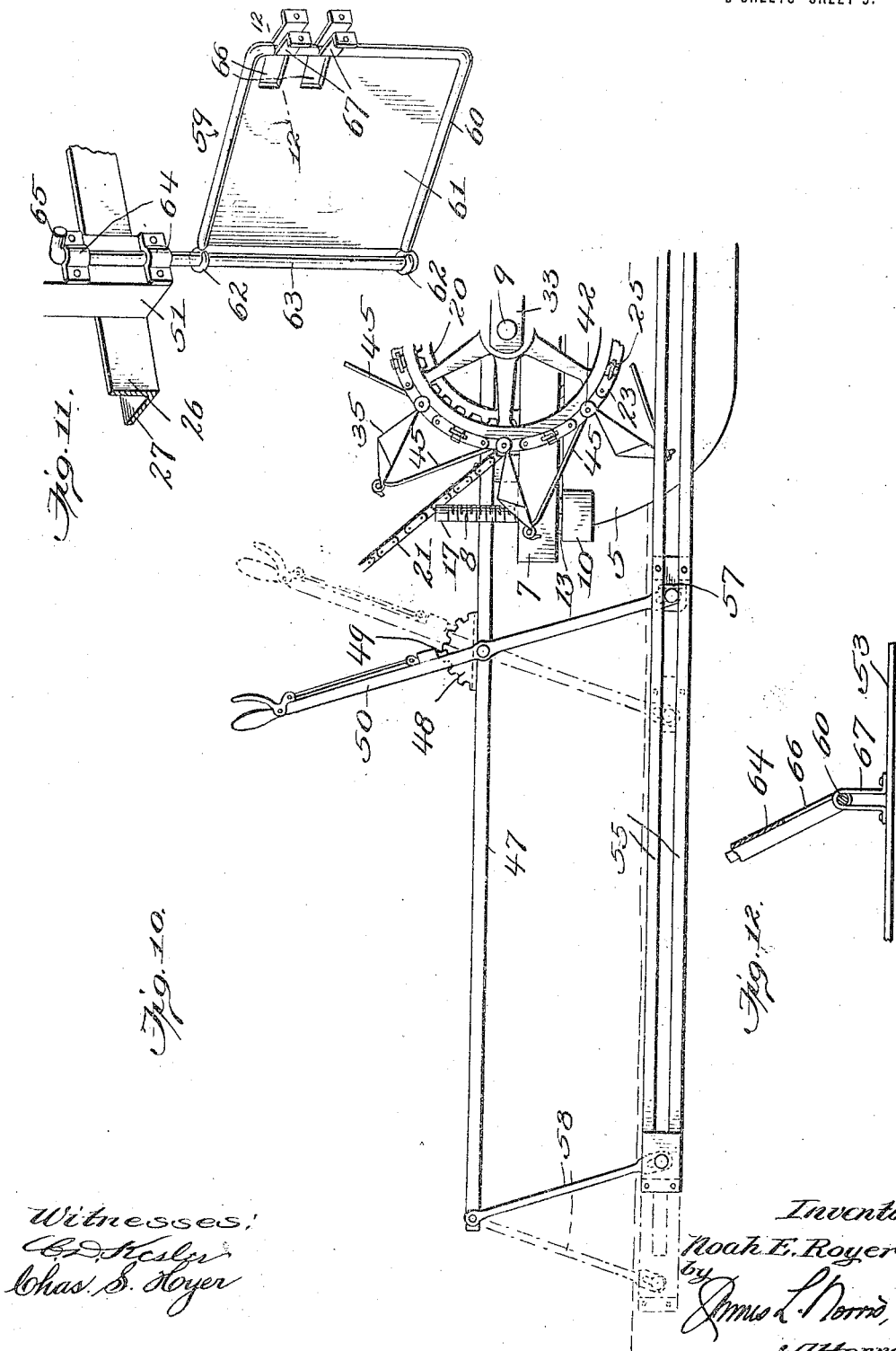

NOAH E. ROYER, OF EMPIRE, CALIFORNIA.

WATER-POWER MECHANISM.

1,234,101.

Specification of Letters Patent.

Patented July 17, 1917.

Application filed June 21, 1916. Serial No. 105,024.

*To all whom it may concern:*

Be it known that I, NOAH E. ROYER, a citizen of the United States, residing at Empire, in the county of Stanislaus and State of California, have invented new and useful Improvements in Water-Power Mechanism, of which the following is a specification.

This invention relates to hydraulic power mechanism of that type embodying a boat or barge which is disposed in a stream or body of running water, such as a river, raceway or analogous water current, the boat or barge being anchored in a suitable location in a current of water or flowing stream, and this boat or barge may be arranged as a stationary base from which the power generated may be conveyed by suitable mechanism located on the base or at points distant from the mechanism held by the barge, boat or base and utilized for operating electric or other machinery or for such purposes as motive power is usually employed.

The primary object of the invention is to provide comparatively inexpensive means controlled exclusively by running water to generate a durable power by mechanism actuated by an under-draft or under part of which the water flows with sufficient force to set up an actuation of the power shaft and to so construct the power generating means as a whole that it may be moved from place to place and provide a cheap and economical means for actuating various mechanisms.

With these and other objects and advantages in view the invention consists in the preferred construction and arrangement of the several parts which will be more fully hereinafter described and claimed.

In the drawings:

Figure 1 is a top plan view of the improved mechanism showing parts of the chain belts and buckets removed.

Fig. 2 is a top plan view on an enlarged scale showing the chain belts and buckets, illustrating the barge or boat broken through and other parts broken away.

Fig. 3 is a side elevation on an enlarged scale of a portion of the mechanism and particularly illustrating the buckets and endless chain belts to which they are connected and their power generating relation to the water.

Fig. 4 is a transverse vertical section through one of the chain belts taken in the plane of the line 4—4, Fig. 2.

Fig. 5 is a transverse vertical section taken in the plane of the line 5—5, Fig. 2.

Fig. 6 is a longitudinal vertical section taken in the plane of the line 6—6, Fig. 2.

Fig. 7 is a detail perspective view of one of the buckets.

Fig. 8 is a longitudinal vertical section taken in the plane of the line 8—8, Fig. 2, and shown on an enlarged scale.

Fig. 9 is a horizontal section taken in the plane of the line 9—9, Fig. 8.

Fig. 10 is a side elevation of one extremity of the barge, boat or supporting base showing a part of the mechanism and particularly illustrating the means for adjusting the trash guards and shields or damming means.

Fig. 11 is a detail perspective view on an enlarged scale of one of the shields or damming means and the support and means for mounting the same.

Fig. 12 is a horizontal section taken in the plane of the line 12—12, Fig. 11, and showing the connections between one of the shields and trash guards.

The numeral 5 designates a boat, barge, float or supporting base for the mechanism which may be of any length and width and may comprise a series of similar devices arranged in tandem, which would be an obvious variation to accommodate lengthening of the prime power generating mechanism which will be presently explained. This boat, barge, float or supporting base 5 will be disposed in the current of a river or other naturally flowing stream of water or it may be arranged in a raceway or sluice, and in either disposition this boat or barge will be held stationary through the medium of an anchoring rope or cable 6 attached thereto, as particularly shown by Figs. 1 and 3. It will be understood that the boat, barge, float or supporting base 5 will be primarily constructed to give the mechanism which is held thereon a proper depression relatively to the water, and on this boat or barge 5 are longitudinally disposed adjusting beams 7 which carry the power generating mechanism, said beams being engaged at opposite extremities by upright adjusting screws 8 which as shown by Fig. 8 are swiveled, as at 9, in cross-beams 10 at the front and rear portions of the boat or barge 5. The swiveled structure of the upright screws 8 is provided by forming the lower ends of said screws with semicircular heads 11 and the beams 10 with corresponding sockets 12 and securing a bifurcated plate 13 over the head 11 on the beam 10. The beams 7 have screw-plates 14 secured to the lower sides thereof and provided with suitable screw-openings 15 with which the upright screw-rods 8 operatively engage, the remaining portions of the screw-rods passing loosely upwardly through smooth bores 16 in the beams 7. The upper ends of the screws 8 are formed with suitable angular heads 17 for engagement therewith of removable cranks or turn wheels and whereby the said upright screws may be rotated to raise and lower the beams 7 and the mechanism supported thereon. Extending across the forward and rear portions of the beams 7 and mounted in suitable bearings 18 are power shafts 19, one or both of which may carry a sprocket wheel 20 or said sprocket wheel may be replaced by a band wheel, which will be an obvious substitution; and from this sprocket wheel 20 as shown a chain belt 21 will extend away from the power mechanism as a whole any distance for conveying the power generated to other mechanism located at a distance therefrom, or the power generated may be transmitted to mechanism located on the boat, barge or base. Each shaft 19 projects outwardly beyond the beams 7 equally at opposite sides of the power mechanism, and on each shaft projecting extremity is a pair of sprocket wheels 22 which are spaced from each other, and the pairs of said sprocket wheels on each side are in longitudinal alinement, and trained thereover are outer and inner chain belts 23 comprising a plurality of jointed links 24 having outwardly projecting horizontal rollers 25 at suitable intervals which engage vertical members 26 of continuous tracks 27 comprising upper and lower track members which terminate in rear of the vertical diameters of the sprocket wheels 22 or terminate short of the positions of the shafts 19, the tracks having inwardly turned or curved extremities 28. These track members are connected by vertical braces 29 at regular intervals, there being one of these braces at each extremity and an intermediate brace in the present construction. Each of the two frames provided by each set of tracks 27 and braces 29 is connected to the next adjacent set by cross ties 30 secured to the braces 29 and in addition there are outer rod braces 31 extending from the upper portions of the end braces 29 to the lower portion of the intermediate brace 29. The tracks arranged in pairs at each side of the beams 7 and connected to the latter as hereinbefore explained are also tied by a continuous cross beam 32 extending centrally with relation to these track frames and secured to the intermediate vertical braces 29. The vertical braces 29 are similarly disposed in connection with each of the separate track members on opposite sides of the beams 7 and the continuous cross beam 32 is secured to each pair of intermediate braces 29 at the center of each track frame, and by this means the track frames are strengthened and uniformly supported as well as strengthened against any tendency to spread or become displaced. Other braces may also be applied to these track frames as may be found necessary to strengthen the same and give them a solid structure to resist the strains imposed thereupon by the power generating mechanism. The shafts 19 also have brace plates 33 engaging the outer ends thereof and secured to a longitudinal brace beam 34 which is attached to the outer intermediate vertical brace 29, the plate and the opposite ends of the longitudinal brace 34 being also secured to the end vertical braces 29 at the outer sides. This construction is duplicated in connection with each track frame and the shafts 19 are thereby held against spreading or springing. The chain ts 23 regularly travel over the sprocket wheels 22 and pass outwardly from and inwardly to the inwardly curved extremities 28 of the tracks 27 without friction or resistance relatively to the said ends.

Movably attached to the chain belts 23 at intervals are buckets 35 preferably constructed of sheet metal and bent into triangular form and have closed ends and upper and lower rolled bearings 37 and 38. By the triangular construction of these buckets as specified one side of each is fully open, and it is preferred that the buckets be each formed from a single piece of sheet metal of suitable rigidity that may be treated to render the same non-corrosive. The upper bearing 37 is slotted, as at 39, near each end thereof, and the lower bearing 38 is shortened relatively to the upper bearing by forming annular recesses 40 at the ends thereof so as to give the same ample clearance for insertion between the pairs of chain belts 23, rods or pintles 41 being inserted in the lower bearings and terminally held at opposite ends in transversely alined links of the chain belts 23. The buckets 35 have a free rocking or swinging movement or are permitted to shift sufficiently to pass around the sprocket wheels 22, as will be readily understood, and the ends of the rods 41 project outwardly beyond the bearings 38 and the chain belts 23 and have rollers 42 mounted on the ends thereof to engage the tracks 27, as shown by Fig. 5, to hold the buckets steady and give them anti-frictional bearing relatively to the said tracks. The rods 41 are of duplicate structure, or each rod partially extends into the bearing 38 of each bucket 35 and is screw-threaded, as at 43, whereby adjustment of each rod may be made relatively to the bearing 38 engaged thereby, so as to effect a positive engagement of the rollers 42 at all times with the tracks 27 and to assist in centering the chain belts and buckets relatively to the tracks, the horizontal rollers 25 coöperating in this adjustment. By this means wear may be taken up by the adjustment of the chain belts and buckets which may be shifted either inwardly or outwardly to maintain the chain belts in proper alinement relatively to the sprocket wheels 22. Rods 44 are also held in the upper bearings 37, and connected thereto through the medium of the slots 39 are the upper ends of braces 45 which extend downwardly and engage the rods 44 close to the opposite terminals of the bearings 38, as clearly shown by Fig. 5. The braces 45 are arranged in pairs between the buckets 35 and operate to strengthen the latter and maintain them in positive resisting position relatively to the water pressure coöperating therewith, but at the same time permitting the buckets to assume a variation in angle or to move when rounding or passing over the sprocket wheels 22. The chain belts 23, sprocket wheels 22 and buckets 35 together with the shafts 19 constitute the power generating means and the track frames engaged by the chain belts and buckets as well as the sprocket wheels 22 and shafts 19 are uniformly adjustable at opposite extremities as may be found necessary by adjusting the beams 7 through the medium of the upright screws 8. By adjusting these beams and the parts carried thereby, as just specified, the dip of the buckets into the water may be varied as found necessary and desirable. In the operation of the machine the buckets will always have their open sides brought into facing relation to the current so that the water will flow thereagainst into the open sides and effect a uniform as well as a continuous operation of the chain belts and buckets, the sprocket wheels 22 and the shafts 19. It will be understood that the buckets 35 may be raised high enough to entirely clear the water when it is desired to stop the operation of the power mechanism, or the power mechanism may be allowed to run continuously and the chain or other belt 21 may have suitable clutch devices coöperating with the power receiving medium with which it engages. This provision, however, will be obvious and is well understood in mechanical constructions.

The improved power mechanism also includes means for protecting the buckets 35 against engagement with trash or floating debris and for damming the water relatively to the buckets. Extending across and secured to the beams 7 are cross supports 46, and secured to these cross supports and extending centrally in a longitudinal direction beyond the adjacent extremity of the boat, barge, float or supporting base a requisite distance is a supporting beam 47 having a toothed segment 48 mounted thereon and adapted to be engaged by a locking dog 49 carried by a shifting lever 50 fulcrumed on the beam 47 at an intermediate point and extending below the latter. On the outer sides of the opposite frames embodying the pairs of brackets 27 are upright posts 51 which extend above the upper limit of the frames and above the plane of operation of the buckets 35, the pairs of posts 51 at opposite sides being connected by cross tie braces 52 secured thereto and operating to reinforce the posts and also the track frames in addition to the bracing means hereinbefore described. Extending along the outer sides of the track frames and at a suitable distance from the latter are parallel guard bars 53 which continue to the opposite or rear extremity of the boat, barge, float or supporting base 5, these bars being arranged in parallel relation, the uppermost bar being slightly below the water level, as indicated at 54, see Fig. 3. To the front extremities of the bars 53 inwardly converging bars 55 are secured, and in advance of the extremity of the float or barge 5 from which the beam 47 projects these continuations 55 of the bars 53 are secured and provide an angular deflector below the beam 47. Adjacent to the points where the bars 55 start to converge from the bars 53, cross brace means 56 connect the latter bars, as clearly shown by Fig. 1, and to a suitable bracket 57 centrally secured to the cross brace means 56 the lower end of the lever 58 is movably connected. The outer end of the beam 47 is also connected to the forward converged uniting point of the bars 55 by a link 58 extending downwardly from the said beam to the united bars 55. The bars 53 together with their converging continuations 55 are simultaneously shiftable in forward and rearward relation or from a normal to an advance position, as indicated by full and dotted lines in Fig. 1, through the medium of the lever 50. By drawing rearwardly on the lever 50 the bars 53 and 55 are moved forward and an opposite movement of the said lever 50 will shift the bars 53 and 55 rearwardly. Loose connections are interposed between the bars 53 and the posts 51, said connections consisting of blades or wings 59 of the form shown clearly by Fig. 11 and operating as trash shields and water damming blades or wings. The blades or wings 59 comprise a U-shaped rod frame 60 to which a sheet metal web 61 is secured, the inner ends of the rod frame being formed into eyes 62 which movably engage a depending pintle rod 63 provided for each wing or blade, each pintle rod being held by bearing straps 64 secured to the lower portion of each post, the upper end of the rod being hooked or bent at an angle, as at 65, to prevent the rod 63 from becoming displaced from the bearing straps 64. The upper portion of the upper end of the web of each wing or blade 61 is formed with a pair of slots 66 vertically disposed relatively to each other for the reception of the bowed portions of elongated clips 67 which are secured to the inner sides of the bars 53, the elongated structure of the clips 67 permitting sufficient loose play to prevent jamming of the wings or blades 59 during the adjustment or shifting movement of the bars 53 and continuing bars 55.

From the foregoing it will be seen that the bars 53 located outside of the plane of travel of the buckets 35 prevent the buckets from being engaged by trash or other floating substances, and when the wings or blades 59 are adjusted into rearward position as shown by dotted lines they also materially shield or protect the buckets against trash engagement and when these shields are adjusted forwardly, as indicated in dotted lines, they serve to dam the water relatively to the buckets and give the latter a deeper water engagement or cause the water to have greater power relatively to the said buckets.

The improved machine will be found exceptionally useful and advantageous for economically generating power for various uses, and the structure may be lengthened by duplicating the mechanism as herein disclosed, or by extending the chain belts and correspondingly increasing the length of the supporting base. It will also be understood that the proportions and dimensions, as well as the minor details of the several parts, may be modified at will.

What I claim is:—

1. In a water power mechanism, a supporting base disposable in a stream of water and movable from one point to another, a frame mounted on and supported solely by the base and provided with means for raising and lowering the same relatively to the top surface of the base, a plurality of water operated buckets connected in endless series and disposed at opposite sides of and held by the said frame, a power shaft extending across the frame and operated by the said plurality of buckets, and guard means arranged at opposite sides of the mechanism and coöperating and adjustable with the said buckets, frame and power shaft relatively to the supporting base.

2. In a water power mechanism, a supporting floating base disposable in a stream of water, a frame mounted on and vertically adjustable relatively to the top of the base, pairs of track frames arranged at opposite sides of the frame at distances outwardly from the sides of the base and having upper and lower track members, endless chain belts movable over said track members and provided with anti-frictional devices to engage the said members, a series of buckets disposed at an angle to the chain belts and attached to the latter, a power shaft held on the frame and having the chain belts and buckets in coöperation with opposite extremities thereof, and guard means along opposite sides of the mechanism and connected to parts of the track members and the frame and uniformly adjustable with the latter relatively to the floating base.

3. A water power mechanism having a supporting floating base which is held in one position in a stream of water, a frame adjustably mounted and movable vertically to and from the top of the said base, endless belts disposed at opposite sides of the base and supported by the frame, the endless belts carrying a plurality of buckets standing at an angle thereto and having brace devices movably attached to the opposite extremities, the braces from the outer extremities of the buckets running inwardly to the inner extremities of said buckets in regular sequence, a power shaft carried by the frame and driven by the belts and buckets through the medium of the engagement of the water with the buckets, and means at opposite sides of the mechanism and held uniformly adjustable with relation to the frame and belts and buckets to operatively protect the outer portions of the buckets.

4. In a water power mechanism, a supporting floating base arranged to have a fixed position in a stream of water, a frame mounted and vertically adjustable on the top of the said base and carrying endless belts at opposite sides thereof, a plurality of triangular buckets fully open at one side and normally disposed in a plane at right angles to the belts and having brace devices alternately movably connected to the inner portions and the outer portions of the buckets in succession, and a power shaft on the frame actuated by the belts and buckets, the belts, buckets and power shaft being uniformly adjustable with the frame relatively to the floating base, the frame being solely held by the base.

5. In a water power mechanism, a supporting floating base which is disposed in fixed position in the stream of water, a frame mounted and vertically adjustable on the top of the base and solely supported by the said base, pairs of track frames arranged at opposite sides of the frame and held by the latter at equal distances from the adjacent sides of the base and having upper and lower track members of angular form, endless chain belts movable over the said track members, a series of buckets disposed at an angle to the chain belts and having means for movably attaching the same to the said belts, the inner portions of the buckets being provided with adjustable devices to regulate the engaging positions of the buckets relatively to the track members, and a power shaft carried by the frame and actuated by the belts and buckets through the coöperation of the water with the buckets, the track frames, chain belts, buckets and power shaft being uniformly adjustable with the frame relatively to the base.

6. In a water power mechanism, a supporting floating base held in fixed position in a stream of water, a frame mounted and adjustable on the top of the base and solely held by the latter, track devices supported by the opposite sides of the frame at a distance outwardly from opposite sides of the base and embodying upper and lower track members, endless chain belts engaging the said track members and having horizontal rollers held beyond the outer sides thereof and bearing against parts of the track members, buckets secured at their inner ends to the chain belts and having screw-rods at the inner and outer sides thereof extending partially thereinto and also through the belts and carrying vertical rollers on their outer ends at the outer sides of the chain belts, the said rollers engaging portions of the track members at right angles to the parts of the said track members engaged by the horizontal rollers, the horizontal rollers being alternately arranged relatively to the vertical rollers, and shafts and sprocket wheels supported by the said frame and extending outwardly beyond the latter, the sprocket wheels being engaged by the chain belts and one of the shafts serving as a power shaft.

7. In a water power mechanism, a supporting floating base held in fixed position in a stream of water, a frame mounted and adjustable on the top of the base and solely held by the latter, track devices supported by the opposite sides of the frame at a distance outwardly from opposite sides of the base and embodying upper and lower track members, endless chain belts engaging the said track members and having horizontal rollers held beyond the outer sides thereof and bearing against parts of the track members, buckets secured at their inner ends to the chain belts and having screw-rods at the inner and outer sides thereof extending partially thereinto and also through the belts and carrying vertical rollers on their outer ends at the outer sides of the chain belts, the said rollers engaging portions of the track members at right angles to the parts of the said track members engaged by the horizontal rollers, the horizontal rollers being alternately arranged relatively to the vertical rollers, braces between the upper and inner portions of the buckets to hold the latter in fixed position to resist the water pressure thereagainst, and shafts held on the said frame and carrying sprocket wheels engaged by the chain belts, one of the shafts serving as a power shaft.

8. In a water power mechanism, a supporting floating base adapted to be held in fixed position in a stream of water, longitudinal beams mounted on and exclusively engaging the said base and provided with end adjusting means, a plurality of buckets arranged at opposite sides of the base for engagement by the water for generating power, a power shaft to which the power generated by the buckets is transmitted, and guards extending along the opposite sides of the plurality of buckets at a distance from the latter and converging with relation to one end of the base and provided with shifting means for changing the position thereof longitudinally with relation to the buckets and base.

9. In a water power mechanism, a supporting base adapted to be held in fixed position in a stream of water and provided with power generating means including a plurality of buckets disposed at opposite sides, and shiftable shields also disposed at opposite sides of the mechanism outwardly beyond the planes of movement of the buckets and operative to clear the buckets of trash and also to dam the water relatively to the buckets.

10. In a water power mechanism, a supporting base adapted to be held in fixed position in a stream of water, power generating means held by the said base and including a plurality of buckets at opposite sides of the base, shiftable guards having portions disposed at opposite sides of the mechanism at a distance from the planes of movement of the buckets and also converging in advance of one end of the base, and shields movably connected at their inner portions to parts of the said power generating mechanism and at their outer ends loosely connected to the guards extending along the opposite sides of the mechanism and shiftable with the said guards.

11. In a water power mechanism, a supporting floating base having cross-beams at the ends thereof provided with sockets near the opposite terminals, longitudinal beams extending over the top of the floating base and resting on the opposite ends of said cross-beams and constituting an adjustable frame, the opposite ends of the longitudinal beams having vertical openings therethrough in alinement with the sockets in the cross beams, adjustable screws having lower spherical socket heads mounted in the said sockets and loosely extending upwardly through the openings in the ends of the longitudinal beams whereby the beams may be adjusted evenly or unevenly with respect to the top of the floating base, shafts extending over and supported by the longitudinal beams and projecting outwardly beyond opposite sides of the said base, track devices held by the longitudinal beams outwardly beyond opposite sides of the said base, and endless chain belts carrying buckets engaging the said track devices and the sprocket wheels, the one shaft serving as the power shaft, all of the parts of the working mechanism being carried solely by the floating base and the chain belts and buckets together with the track devices being adjustable either uniformly or irregularly to give the required submergence and engagement of the buckets with the water.

In testimony whereof I have hereunto set my hand in presence of two subscribing witnesses.

NOAH E. ROYER.

Witnesses:
R. P. FICKEL,
ADAH B. CAYLOR.